United States Patent [19]

Peev et al.

[11] Patent Number: 4,601,129
[45] Date of Patent: Jul. 22, 1986

[54] MACHINE FOR VINE MATERIAL ENGRAFTING

[75] Inventors: Jivko N. Peev; Penko M. Siderov, both of Veliko Tirnovo, Bulgaria

[73] Assignee: Zavod "Avtomatika", District Russe, Bulgaria

[21] Appl. No.: 620,107

[22] Filed: Jun. 13, 1984

[30] Foreign Application Priority Data

Jun. 15, 1983 [BG] Bulgaria .................................. 61343

[51] Int. Cl.$^4$ ............................................. A01G 1/06
[52] U.S. Cl. ........................................................ 47/6
[58] Field of Search .................................... 47/1, 6, 7

[56] References Cited

U.S. PATENT DOCUMENTS 107,427 9/1870 Wagener ................................. 47/6

FOREIGN PATENT DOCUMENTS

| 40081 | 12/1901 | Austria | 47/6 |
| 29582 | 1/1981 | Bulgaria | 47/6 |
| 30332 | 6/1981 | Bulgaria | 47/6 |
| 2256199 | 5/1974 | Fed. Rep. of Germany | 47/6 |
| 2908785 | 9/1979 | Fed. Rep. of Germany | 47/1.6 |
| 3011658 | 10/1980 | Fed. Rep. of Germany | 47/1.6 |
| 3017012 | 11/1980 | Fed. Rep. of Germany | 47/1.6 |
| 3227857 | 1/1984 | Fed. Rep. of Germany | 47/1.6 |
| 3421942 | 12/1984 | Fed. Rep. of Germany | 47/1.6 |
| 1152708 | 2/1958 | France | 47/6 |
| 1212367 | 3/1960 | France | 47/6 |
| 1343411 | 10/1963 | France | 47/6 |
| 2541562 | 8/1984 | France | 47/6 |
| 107246 | 11/1956 | U.S.S.R. | 47/6 |
| 281061 | 12/1970 | U.S.S.R. | 47/6 |
| 490429 | 2/1976 | U.S.S.R. | 47/6 |
| 470130 | 6/1978 | U.S.S.R. | 47/1 R |
| 633509 | 11/1978 | U.S.S.R. | 47/6 R |
| 1069092 | 1/1984 | U.S.S.R. | 47/6 R |

Primary Examiner—James R. Feyrer

[57] ABSTRACT

The engrafting machine comprises a carrying frame to which is mounted an endless apron conveyor with measuring clamps and a sorting device having sequently disposed calibrating cams. Underneath each cam is formed in the frame a pocket for collecting the sorted grafts and stocks. The measuring clamp is provided with a movable and an unmovable jaw. To the movable jaw is connected a lever with a control pin that is disposed perpendicularly to the plane of the calibrating cams. In the charging zone of the endless apron conveyor are provided feeding cams for opening the measuring clamps. Parallel below the endless conveyor in its charging zone is fastened an auxiliary apron conveyor with pressing elements. Sequentially in the direction of the movement are disposed an one-disk and a two-disk cutting apparatus. To the carrying frame is mounted further an engrafting apparatus.

The described machine is used in the preparation of vine planting material in the agriculture.

8 Claims, 8 Drawing Figures

MACHINE FOR VINE MATERIAL ENGRAFTING

This invention relates to a machine for grafting vine material, such machine being adapted to be used in agriculture for the preparation of vine planting material.

Bulgarian Inventor's Certificate No. 29 582 discloses a machine for cutting and sorting vine materials comprising a carrying frame on which there is mounted an endless apron conveyor with measuring clamps and a sorting device having calibrating cams disposed in succession. Beneath each calibrating cam there is disposed a pocket for collecting the sorted vine cuttings. The endless apron conveyor is mounted in a vertical plane, and it has a vertical, a horizontal, and an inclined branch connecting them. In the vertical branch zone there is disposed a two-disc cutting apparatus with its own driving means. One of the cutting discs of the apparatus is axially adjustable for providing cuttings with two different lengths. Each measuring clamp of the endless conveyor has an immovable jaw and movable jaw with a lever mounted on it in a hinged and elastic manner. A control pin is fastened to the end of the lever, the pin being disposed perpendicularly to the plane of the calibrating cams which are disposed consecutively in the zone of the horizontal branch of the conveyor. On both the movable and immovable jaws there are formed seats with two walls disposed at right angles with respect to each other. In the zone of the vertical branch of the endless conveyor, upstream of the cutting apparatus there is provided a feeding cam for opening the measuring clamps during their being charged with vine cuttings. To the driving shaft of the endless apron conveyor in the charging zone there is coupled a carrier used in the case of long cuttings for stocks. The carrier comprises a disc with pins, a part of which is embraced by a slider which is maintained pressed against the pins. On the input side, each calibrating cam has a leading flexible lamella made of an elastic material and fixedly attached to one end of the body of the cam.

A disadvantage of the above-described known machine is that with it, it is not possible to simultaneously to cut and sort different kinds of vine cutting-for grafts and stocks. This results in a considerable loss of time, thus influencing negatively the material being submitted to grafting. The vertical disposition of the endless apron conveyor determines the length of the zone for cutting only its horizontal branch; this limits the output of the machine.

Another disadvantage caused by this disposition of the endless apron conveyor is the necessity of disposing the pockets for the sorted material and respective calibrating cams very near to each other, thus leading to the physical mixing of the neighboring fractions. Furthermore, the peripheral motion of the carrier in cutting the stocks is not entirely synchronized with the movement of the endless apron conveyor so that the cut is not perpendicular, thus adversely affecting the grafting operation. The construction and design of the measuring clamps and feeding flexible lamellae of the calibrating measuring clamps creates bad working conditions and lead to possible accidents. A shortcoming of the machine is also that it can perform only cutting and sorting. The grafting is carried out in another auxiliary machine.

Another grafting machine is known (Bulgarian Inventors' Certificate No. 30 332) that consists of an electric motor to which there is coupled a rotor with a face clamp and a replaceable drill. To the rotor there are frictionally connected two diametrically disposed discs with seats with cutting tools mounted therein. On the one disc, the cutting tool comprise two trimming and two shaving cutters which are disposed diametrically opposite to each other, whereas on the other discs there are only two trimming cutters. All the cutters are mounted with the possibility for adjustment in the radial direction. Upstream of the rotor and the discs there is mounted a cover with holes disposed respective coaxially with respect to the cutting zone of the cutting tool.

A shortcoming of this known grafting machine is that it does not assure a quality cutting and drilling of the respective cuttings—grafts and stocks—so that the copulation is not complete. The frictional drive of the discs with the cutting tool causes vibrations of the machine which adversely affects its operation.

An object of the present invention is to provide a machine for the grafting of vine material that permits the simultaneous cutting, sorting and grafting of grafts and stocks with an increased precision, a higher output, and a better quality of the work.

These objects are achieved by a machine in accordance with the present invention. Such machine comprises a carrying frame on which there is mounted an endless apron conveyor with measuring clamps and a sorting device having consecutively disposed calibrating cams. To the carrying frame underneath each calibrating cam there is formed a pocket for collecting the sorted cuttings. Each measuring clamp has a movable jaw and an immovable jaw with seats, the wall of which are disposed at right angles with respect to each other. To the removable jaw there is connected a lever with a control pin on its free end. The control pin is disposed perpendicularly to the plane of the calibrating cams, each of the cams having a guiding flexible lamella for receiving the control pin. In the zone of charging of the endless apron conveyor there are provided feeding cams to open the measuring clamps. According to the invention, the endless apron conveyor is mounted horizontally on the carrying frame, the conveyor having a zone being charged with grafts and stocks extends in cantilever fashion outside the frame. The calibrating cams of the sorting device are disposed consecutively beneath and above the endless apron conveyor on its two long sides. The levers of the measuring clamps are also oriented respective, successive levers extending upwardly and downwardly. Parallel to and below the endless apron conveyor in its charging zone in a direction towards the carrying frame there is fastened a horizontally disposed and synchronously moving auxiliary apron conveyor with pressing elements. Consecutively disposed in the direction of the conveyor movement upstream of the feeding cam there is disposed a one-disc cutting apparatus and a two-disc cutting apparatus. To the carrying frame beneath every two pairs of seats there is mounted a grafting apparatus.

The removable flexible lamella of each calibrating cam is mounted in a movable manner and consists of a rod fastened by a cantilever at one to the body of the cam while in the other end there is received the control pin of the respective measuring pin which is fastened in a movable and elastic manner to a directing point. Near to its front part, the rod is suspended on the body by means of an adjustable elastic support.

Each measuring clamp comprises a body to which there is fixed an immovable jaw, whereas the movable jaw is mounted by a slider seated in sleeves in the body.

The slider maintain in its extreme closed position by a spring. To the body there is fastened a roll the axis of which is paralleled to the plane of the jaw. The roll is embraced by a flexible non-elastic element that is fixed thereon, while its two ends are fastened to the movable jaw. Radially with respect to the roll and connected thereto is the lever provided with the control pin.

The trimming apparatuses are provided with cutting discs, disposed horizontally, the cutting disc of the one-disc apparatus being disposed immediately beneath the endless apron conveyor, while the cutting discs of the two-disc apparatus are fastened to a common shaft in the upper part of the endless apron conveyor and in the lower part of the auxiliary apron conveyor.

Each grafting machine comprises a common plate with two rotors thereon drivingly connected by a belt transmission, one of the rotors being a trimming rotor and the other of the rotors being a drilling rotor. Rotors are driven by a common electric motor coupled with the driving rotor. Both rotors have as a base a disc with a belt pulley. Radially of the disc of the trimming rotor along two diameters perpendicular to each other there are mounted oppositely to each other two finishing and two-shearing cutters which are adjustable in the radial direction. To the disc there is fastened a center extending forwardly and opposite to it there is disposed a directing bar having an opening in its which is coaxial with respect to the center. Directly upon the electric motor there is mounted a chuck with a drill. Fixedly mounted upon the chuck is the disc of the grilling rotor to which are fixed columns carrying two arched cutters disposed on the same level above the two parts of the disc so that its centers are disposed in opposite directions with respect to the axis of the drilling rotor. Above the distance cutters there is placed a directing bar which is fastened rigidly to the basic plate by means of distance columns. Coaxially of the electric motor there is elastically mounted upon the directing bar a sleeve-guide in which there are diametrically formed a correcting and calibrating opening.

The advantages of the machine according to the invention are determined by the possibility of simultaneously carrying out with it the cutting, sorting, and grafting operations without a supplementary adjustment, while the copulation or joining of the vine parts can be effective immediately after the operations are carried out in the machine. The construction of the measuring clamps in the calibrating cams permits the effecting of a strictly perpendicular cutting of the grafts and the stocks as well as their accurate orientation with respect to the pockets for the respective dimensions. Due to the horizontal disposition of the endless apron conveyor, the output of the machine is high since its two long branches are used to locate a great number of calibrating cams. The supplementary treatment of the sorted drafts and stocks and grafting apparatus is strictly differentiated for the respective dimensions. The construction of the grafting apparatus ensures an accurate treatment of the copulation ends of the grafts and stocks with smooth shears without traumatizing the tissues and without clogging the conductive vessels of the material.

In the accompanying drawings there is shown by way of example a preferred embodiment of the machine according to the invention, wherein.

Figure 1:
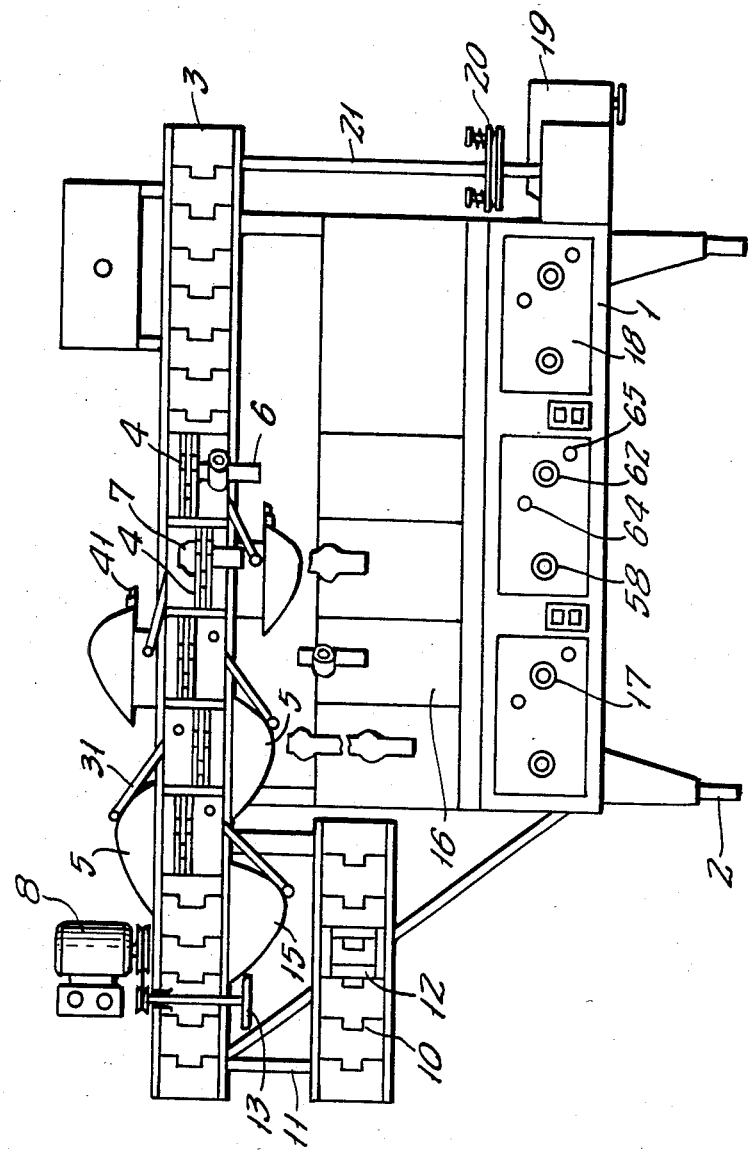
FIG. 1 is side view of the graft charging part of the machine.
Figure 2:
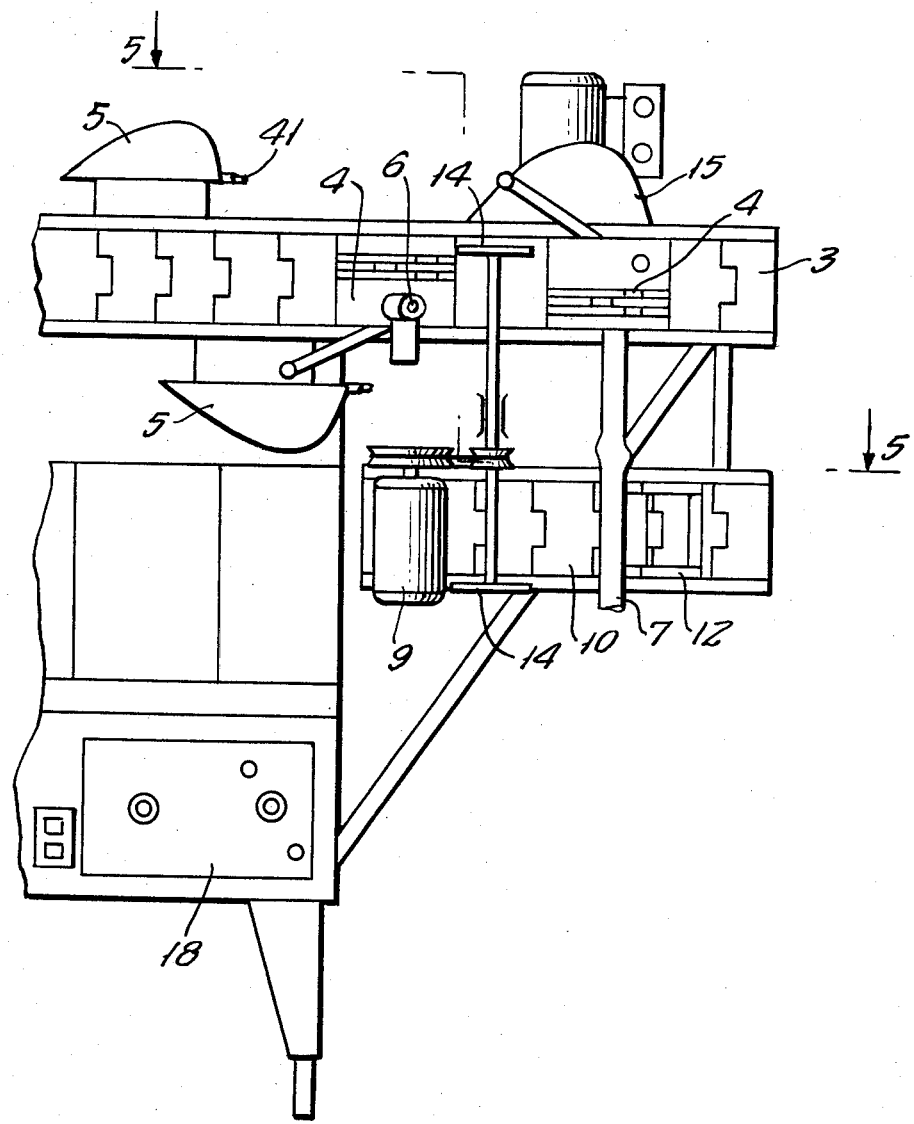
FIG. 2 is a partial lateral view of the machine from the side of its stock charging.
Figure 3:
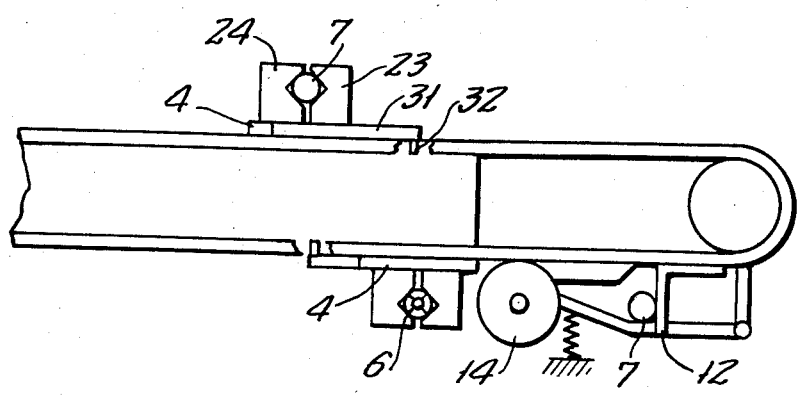
FIG. 3 is top view of the discharged cantilever end of the endless apron conveyor.
Figure 4:
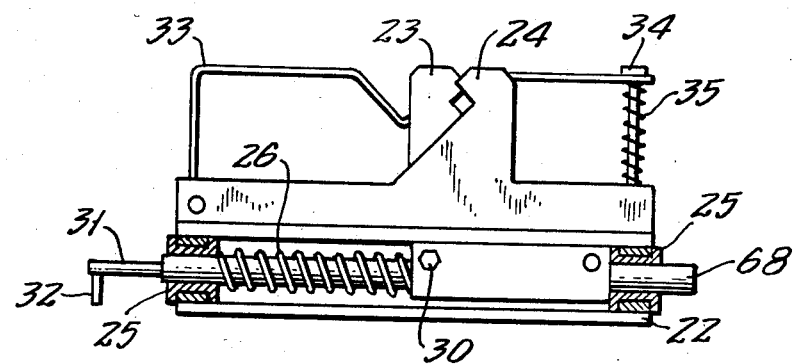
FIG. 4 is a top view with a partial cross-sectional view of a measurement clamp.
Figure 5:
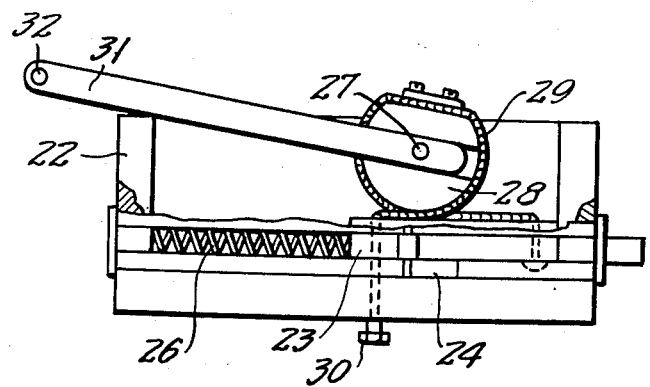
FIG. 5 is a lateral view of a measuring clap.
Figure 6:
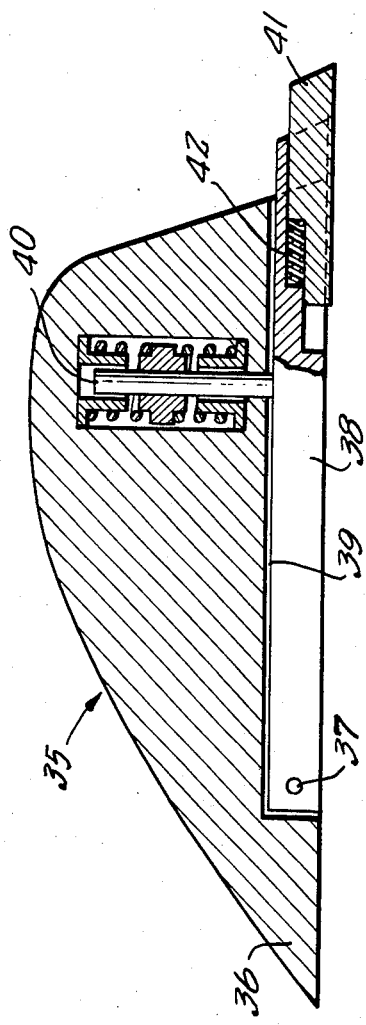
FIG. 6 is a cross-section of a calibrating cam.
Figure 7:
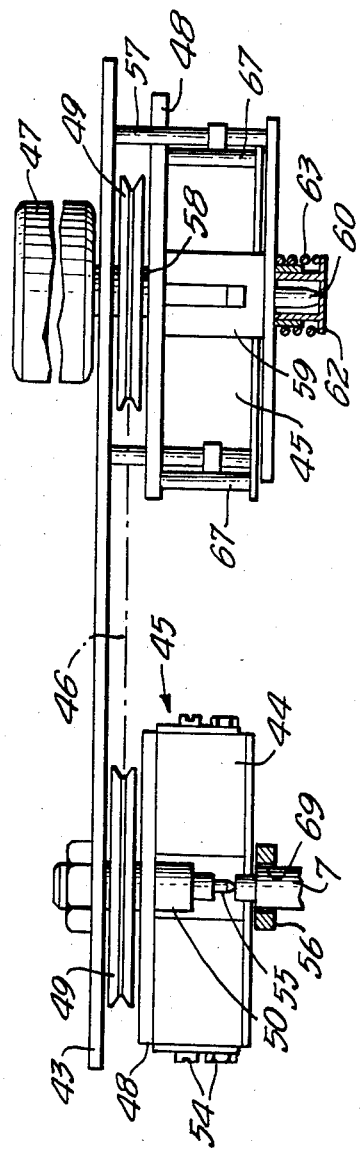
FIG. 7 is a top view with partial cross-sections of the grafting apparatus.
Figure 8:
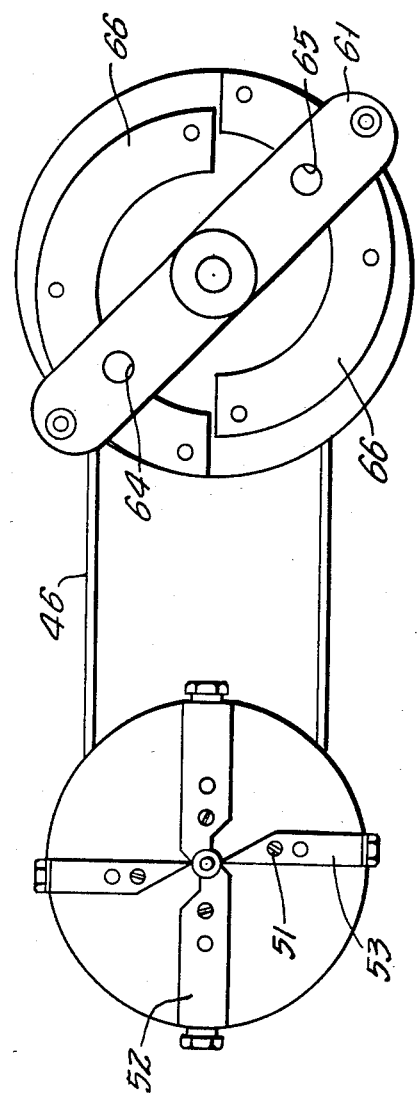
FIG. 8 is a front of the grafting apparatus with the cover removed therefrom.

The illustrative grafting machine has a carrying frame with four supports 2. In the upper part of the carrying frame there is mounted horizontally an endless conveyor 3 carrying measuring clamps 4. Also in the upper part of the carrying frame 1 there is provided a sorting device incorporating calibrating cams 5 fastened fixedly to the carrying frame 1 and disposed sequentially beneath and above the endless apron conveyor 3. The measuring clamps 4 are also oriented in a sequential manner with respect to the upper and lower calibrating cams 5 so that two of the lower clamps 4 there are fastened grafts 6 and to the upper clamps for there are fastened supports 7. A charging zone of the endless apron conveyor 3 is of cantilever construction extending outside the carrying frame 1, while sequentially in the direction of movement of the carrying frame 1 there are mounted a one-disc cutting apparatus 8 and a two-disc cutting apparatus 9. Below the counter-lever part of the endless apron conveyor 2 on the carrying frame 1 there is fastened an auxiliary apron conveyor 10 which is driven synchronously with the apron conveyor 3 by means of a driving shaft 11 extending from the endless apron conveyor 3. To the auxiliary apron conveyor 10 there are fastened pressing members 12 for fixing the longer vine cuttings 7 for stocks. Both cutting apparatuses are disposed in each branch of the endless apron conveyor 3, so that the cutting disc 13 of the one-disc cutting apparatus 8 is horizontal and is placed immediately below the endless conveyor 3, while the cutting disc 14 of the two-disc cutting apparatus 9 is also horizontal and is placed immediately adjacent to the external sides of the both conveyors 3 and 10. Prior to the cutting apparatuses 8 and 9 on the cutting frame 1 there is mounted on each a feeding cam 15 in order to open the measuring clamps 4 so that for the graft 6 it is disposed beneath and for the stocks 7 it is disposed overhead.

Below each calibrating cam 5 on the carrying frame 1 there are formed pockets 16, respectively for grafts and stocks. Beneath the pockets 16 for every two pairs with adjacent dimensions there are mounted on the carrying frame 1 grafting apparatus 17, which is enclosed by protective covers 18.

The endless conveyor 3 is driven by a motor 19 and main shaft 21 in which there is interposed a clutch 20.

Each measuring clamp 4 consists of a body 22, connected rigidly to the endless apron conveyor 3. To the body 22 there are fastened a movable jaw 23 and fixed jaw 24. The movable jaw 23 is mouned on a slider 68, seated by means of sleeve 25 and the body 22, and it is supported in the end closed position by a pressing spring 26. To the wall of the body 22 and a shaft 27 there is fastened a roll 28 embraced by a flexible non-elastic element 29 fixed thereon, for example, a wire rope both ends which are connected rigidly with the body of the movable jaw 23. To one end of the flexible element 29 there is provided a strainer 30. To the roll 28 on the shaft 27 there is rigidly affixed a radial lever 31 and the free end of which there is mounted a control pin 32 which engages, during the movement of the endless apron conveyor 3, the profile of a respective calibrating cam 5. The movable jaw 23 and the fixed jaw 24 have well-formed seats with walls disposed at right angle with respect to each so that above the seats on the fixed jaw 24 there is mounted a pusher 33 fastened in an adjustable manner by means of guide 34 and spring 35.

Each calibrating cam 5 is formed by body 36 on one side of which on the shaft 37 there is mounted by hinges a composite movable elastic lamella formed itself by rod 38 disposed in a particular channel 39. Near the front part, the rod 38 is fastened by a adjustable elastic support 40 to the body 36 of the calibrating cam 5. In the front part of the rod 38, as an extension thereof there is mounted a point 41 set against the rod 38 by the spring 42. Thus, the loose suspended point 41 receives and directs the control pin 32 of the measuring clamp 4.

The grafting apparatus 17 comprises a common plate 43 on which at a certain distance there are mounted a trimming rotor 44 and drilling rotor 45. These two rotors are kinematically connected by means of a belt transmission 46 driven by an electric motor 47 which is coupled to the drilling rotor 45. The trimming rotor 44 and the drilling rotor 45 have as a base a disc 48 with a belt pulley 49 provided thereon. The disc 48 of the trimming rotor 44 is seated on a shaft 50 which is affixed rigidly to the common 43. Radially of the disc 48 along lines perpendicular to each other there are mounted by affixing screws 41 to cutting-on cutters 52 and two finishing cutters 53 whose positions in the radial direction are adjustable by control grooves 54. To the disc 48 in its middle there is fastened a cutter 55 beneath the spring, and over the center is disposed a directing bar 56 supported by distance columns 57 that are fastened to the common plate 43. In the directing bar 56 there is provided an opening 69 coaxial with the center 55 for the treated stock 7.

The disc 48 of the drilling rotor 45 is rigidly affixed to a chuck 58 coupled with the shaft of the electric motor 47, while in the chuck 58 is fixed a rod 59 with a drill 60 that passes through a directing bar 61 which stretches along a diameter of the drilling rotor 45; outside it, it is fastened by means of distant columns 57 to the common plate 43. Coaxially of the drill on the directing bar 61 there is fastened a sleeve-guide 62 supported by the limiting spring 63. On the directing bar 61 there are formed diametrically a correcting opening 64 and calibrating opening 65. Beneath the directing bar 61 there are disposed through bow-shaped cutters 66 which are situated on the same level above the two halves of the discs 48 so that their centers are disposed in opposite directions with relation to the axis of the drilling rotor 45. The bow-shaped centers 66 are fastened by the columns 67 to the disc 48.

The above-described drafting machine operates as follows:

During the movement of the endless apron conveyor 3, the measuring clamps 4 are shifted and the control pin 32 of each clamp 4 depending on the orientation of the lever 31 enters into contact with one of the feeding cams 15, whereby the movable jaws 23 of the measuring clamp 4 moves to open its seat. The approximately placed operators set a graft 6, the bud of which is oriented below the measuring clamp 4 and the stock 7. The graft 6 passes through the one-disc cutting apparatus 8 where the graft is cut under the bud. Then the graft 6 passes through the two-disc cutting apparatus 9 and its upper cutting disc 14 cuts the other side of the graft 6, thus determining its length. The cutting of the stocks 7 is effected by the two-disc cutting apparatus 9 and the fastening of the stocks 7 is accomplished except for the measuring clamps 4 and the cylindrical part immediately below the first knot also with the pressing member 12 mounted to the auxiliary apron conveyor 10. The grafts 6 and stocks 7 charged upon the endless conveyor 3 in this manner are pressed tightly against the measuring clamps 4 that are opened when contacting the respective calibrating cam above the respective pocket 16. The cut grafts 6 and stocks 7 sorted according to the respective pocket 16 are at the disposal of the operators disposed around the grafting apparatus 17. Each operator takes into his left hand a stock 7 and places its top end in the opening 69 of the directing bar 56 in front of the center 55 which is below the spring and its travel determines the dimension of the treated part of the stocks 7. The stock 7 is trimmed away by the cutting cutters 52 that are centered and directed to the center 55. At the same time, the finishing cutters 53 trim the stem's end. In extracting the stock 7, the movable center 55 centers the stock, and thus protects it from the cutters. With the right hand, the operator takes the graft 6 and places it in the calibrated opening 65 where the disc cutter 66 of the drilling rotor 45 executes the shear very smoothly and strictly perpendicularly. Then the graft 6 is placed through the sleeve-guide 62 to the drill 60 which forms the copulation opening in the graft 6. In cases when the stock 7 is cut off in its top part in a knot, and cannot be passed into the open 69 of the directing bar 56, the trimming rotor 45 makes a correction cutting of the knot and the stock 7 is then set in the correction opening 64 of the directing bars 61 by the drilling rotor 45. The copulation between the stock and graft 6 is effected manually.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A machine for performing multiple functions in preparing stem materials for grating, comprising:
   frame means;
   a sorting device composed of endless apron conveyor, said endless apron conveyor is mounted for circulating movement about the top portion of said frame means, a series of calibrated cams mounted on said frame means and associated with said endless apron conveyor, said endless apron conveyor including a plurality of cam actuated measuring clamps and means causing circulating movement of said endless apron conveyor past said calibrated cams whereby said measuring clamps are actuated by said calibrate cams;
   storage pocket means for collecting and storing, separately, respectively-sized materials to be grafted;
   each said measuring clamp including a movable jaw and an unmovable jaw, said movable jaw including a cam follower lever assembly, said cam follower lever assembly having a lever arm and a cam following control pin perpendicular to said lever arm, whereby upon circulation of said endless apron conveyor, the measuring clamp will be actuated by the action of the cam follower lever assembly as the control pin follows the profile of the cam;

each said cam including a movable lamella means at the leading side of the cam for initial contact with said cam following control pin;

said calibrated cams being disposed in a series of upwardly disposed lobes and a series of downwardly disposed lobes, with the lobes of each series being disposed between the lobes of other series, each storage pocket corresponding in location with a respective lobe of a respective calibrated cam whereby upon circulation of said endless apron conveyor, materials can be deposited in a storage pocket for materials of a predetermined size by the action of the cam follower pin on the calibrated cam corresponding to the respective storage pocket;

a charging zone where materials to be grafted can be inserted into the measuring clamps;

a one-disk cutting apparatus, said one-disk cutting apparatus being mounted on said frame means and having a power source;

a two-disk cutting apparatus, said two-disk cutting apparatus being mounted on said frame means and having a power source;

a graft stem trimming means mounted on said frame means for shaping the ends of said materials to be grafted; and an auxiliary apron conveyor disposed below a portion of said endless apron conveyor and means powering said auxiliary conveyor with said apron conveyor.

2. The machine as defined in claim 1, wherein said flexible lamella comprises a rod, said rod having a first end pivotally connected to the body of the respective calibrated cam, the rod including a second end which bears a resiliently mounted point member, and a support member intermediate the first end and the second end adjustably connects said rod to the lobe portion of said respective calibrated cam.

3. The machine as defined in claim 1, wherein the unmovable jaw is fixed to a body, the body includes sleeve means, a slider element is disposed within said sleeve means, the movable jaw being fixed to said slider element, means within said sleeve means for biasing said slider element in a direction such that said movable jaw normally contacts said unmovable jaw, said cam follower lever assembly including a roll attached to said lever arm at an end of the lever arm opposite said control pin, a flexible, non-elastic element having a first and a second end, the first end connected to said slider element on one side of said roll, said second end connected to said slider element on the other side of said roll, whereby actuation of said lever arm of said cam follower assembly will cause translation of said slider element within said sleeve means against said biasing means to thereby open said respective measuring clamp.

4. A machine as defined in claim 1, wherein said one-disk cutting apparatus comprises a single cutting disk disposed beneath the endless apron conveyor.

5. A machine as defined in claim 1, wherein the two-disk cutting apparatus includes two spaced-apart cutting disks, each said spaced-apart disk disposed at an opposite end of a common, powered vertical shaft, the upper disk located proximate said endless apron conveyor and said lower disk being located proximate said auxiliary conveyor.

6. A machine as defined in claim 1, wherein said graft stem trimming means comprises a common mounting plate, a trimming rotor means and a drilling rotor means, each operatively mounted on said common mounting plate, a motor drive means for powering said drilling rotor means, and a belt transmission means for kinematically powering said trimming rotor means from said drilling rotor means.

7. A machine as defined in claim 6, wherein said trimming rotor means includes a mounting disk, two diametrically opposed cutters, and two diametrically opposed finishing cutters, said finishing cutters being placed at an angle of 90° relative to said cutters, said mounting means including a spring biased centrally protruding element for guiding the stem material being trimmed, means for adjustably fixing said cutters and said finishing cutters to said mounting disk, and a directing bar fixed to said common plate and positioned to overlie said centrally protruding element, said directing bar defining an aperture concentrically overlying said centrally protruding element, whereby the material to be grafted can be maintained centrally of the trimming rotor as it is inserted through and removed from said aperture defined in said directing bar.

8. A machine as defined in claim 6, wherein said drilling rotor means includes a shaft having an axis in common with the axis of said motor, a chuck mounted axially on said shaft, and a drill mounted axially within said chuck, a disk fixed to the base of said chuck to rotate with said chuck, plural support columns fixed to said disk, said support columns being parallel to the axis of said shaft and extending in the direction of said chuck from said disk, a pair of oppositely disposed bow-shaped cutters, each fixed to half said support columns on a common plane parallel to said disk, each bow-shaped cutter defining a cutting edge which is progressively closer to said axis from one end of each bow-shaped cutter to the opposite end of the respective bow-shaped cutter, a directing bar fixed relative to said common mounting plate and positioned to lie closely adjacent said bow-shaped cutters, said guide plate defining at least one aperture which lies between and has a diameter less than the distance between the difference between the ends of the cutting edge of the bow-shaped cutters and said axis, a central aperture defined in said guide plate concentric to said drill, and a sleeve guide mounted concentric to said central aperture.

* * * * *